US012620695B2

(12) United States Patent
Sekita et al.

(10) Patent No.: US 12,620,695 B2
(45) Date of Patent: May 5, 2026

(54) VEHICLE MOUNTED ANTENNA

(71) Applicant: Nissan Motor Co., Ltd., Yokohama (JP)

(72) Inventors: Suguru Sekita, Kanagawa (JP); Mitsunori Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/717,026

(22) PCT Filed: Dec. 7, 2021

(86) PCT No.: PCT/JP2021/045007
§ 371 (c)(1),
(2) Date: Jun. 6, 2024

(87) PCT Pub. No.: WO2023/105650
PCT Pub. Date: Jun. 15, 2023

(65) Prior Publication Data

US 2024/0421467 A1 Dec. 19, 2024

(51) Int. Cl.
*H01Q 1/32* (2006.01)
*H01Q 1/02* (2006.01)

(52) U.S. Cl.
CPC ................. *H01Q 1/32* (2013.01); *H01Q 1/02* (2013.01)

(58) Field of Classification Search
CPC ................................... H01Q 1/32; H01Q 1/02
See application file for complete search history.

(56) References Cited

U.S. PATENT DOCUMENTS

2008/0129619 A1* 6/2008 Lee ........................ H01Q 21/26 343/810
2008/0224945 A1* 9/2008 Takaoka ............... H01Q 1/1207 343/895
2021/0387684 A1* 12/2021 Smith .................. B62D 35/007

FOREIGN PATENT DOCUMENTS

| | | | |
|---|---|---|---|
| CN | 101032052 | A | 9/2007 |
| CN | 106972275 | A | 7/2017 |
| CN | 110024224 | * | 12/2017 |
| JP | 2002-9522 | A | 1/2002 |
| JP | 2008-78971 | A | 4/2008 |
| JP | 2010-130268 | A | 6/2010 |
| JP | 2018-16144 | A | 2/2018 |
| JP | 2020-75519 | A | 5/2020 |
| KR | 10-2072000 | B1 | 1/2020 |

OTHER PUBLICATIONS

Chinese Office Action of Oct. 30, 2024 of corresponding Chinese Patent Application No. 202180104435.9.
Extended European Search Report of Jan. 13, 2025 of corresponding European Patent Application No. 21966588.2.

* cited by examiner

*Primary Examiner* — Awat M Salih
(74) *Attorney, Agent, or Firm* — Spencer Fane LLP

(57) ABSTRACT

A vehicle mounted antenna is inside a cockpit module. The vehicle mounted antenna is positioned above a duct in the cockpit module at least a certain distance from an on-board device that is a source of noise and that is positioned below the duct. The duct is installed via a metal bracket that has a higher heat conductivity than the vehicle mounted antenna.

6 Claims, 2 Drawing Sheets

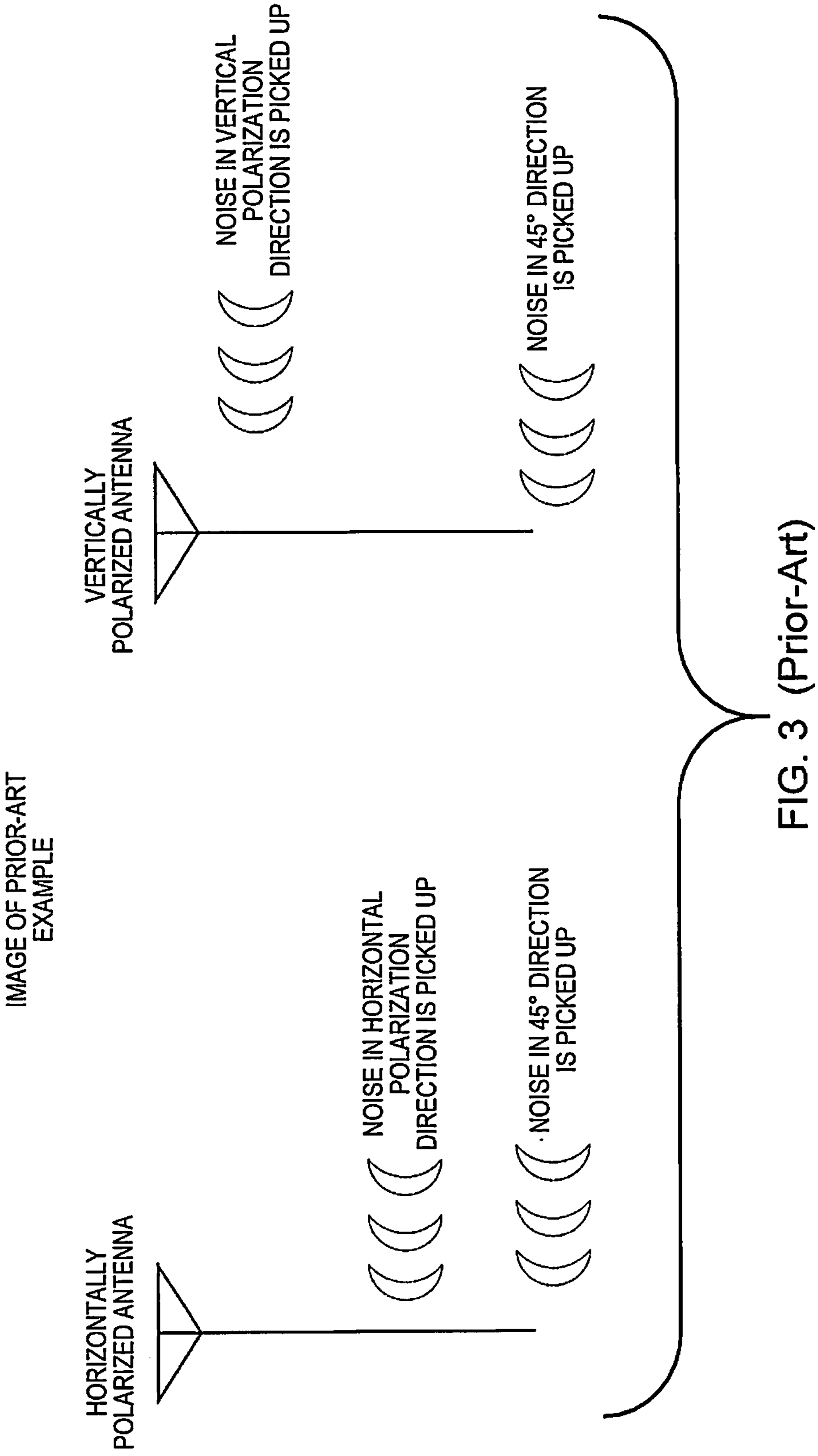
FIG. 3 (Prior-Art)

VEHICLE MOUNTED ANTENNA

CROSS-REFERENCE TO RELATED APPLICATIONS

This application is a U.S. national stage application of International Application No. PCT/JP2021/045007, filed on Dec. 7, 2021.

BACKGROUND

Technical Field

The present invention relates to a vehicle mounted antenna.

Background Information

Vehicle mounted antennas that can reduce electromagnetic noise have been disclosed in the prior art.

For example, Japanese Laid-Open Patent Application No. 2008-78971 (Patent Citation 1) discloses a receiving antenna comprising a horizontally polarized receiving antenna that reduces and eliminates reception of electromagnetic noise having vertically polarized directionality, a vertically polarized receiving antenna that reduces and eliminates reception of electromagnetic noise having horizontally polarized directionality, and a signal-combining and -selecting means that is connected to the horizontally polarized receiving antenna and the vertically polarized receiving antenna and that selects or combines received signals from these receiving antennas, in order to reduce electromagnetic noise generated from a wire harness installed inside a vehicle.

SUMMARY

However, the prior-art technologies of Patent Citation 1, etc., present a problem in terms of being a combination of antennas that function through the difference in polarization directions, and still being affected by noise, depending on the direction from which the noise arrives.

The problem of heat being readily generated becomes noticeable when high-frequency communication is performed, such as with a 5th generation mobile communication system (5G).

The present invention was devised in view of the problems described above, providing a vehicle mounted antenna that reduces the effects from noise inside the vehicle, properly dissipates generated heat, and enables satisfactory communication.

A vehicle mounted antenna according to one aspect of the present invention is a vehicle mounted antenna inside a cockpit module, the vehicle mounted antenna being positioned above a duct inside the cockpit module, at least a certain distance from an on-board device that is a source of noise and that is positioned below the duct.

According to the present invention, the effects from noise inside a vehicle are reduced, generated heat is properly released, and satisfactory communication can be performed.

BRIEF DESCRIPTION OF THE DRAWINGS

Referring now to the attached drawings which form a part of this original disclosure, an illustrative embodiment is shown.

FIG. 3 shows a problem in a prior-art example such as that of Patent Citation 1.

DETAILED DESCRIPTION

An exemplary embodiment of the present disclosure shall be described below with reference to the drawings.

Figure 1:
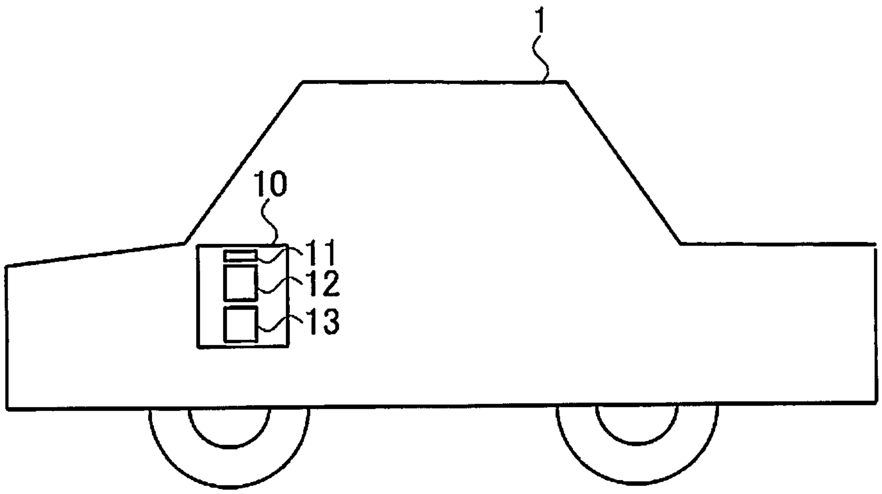
FIG. 1 shows one example of the positioning of a vehicle mounted antenna as seen from a lateral direction of a vehicle.
Figure 2:
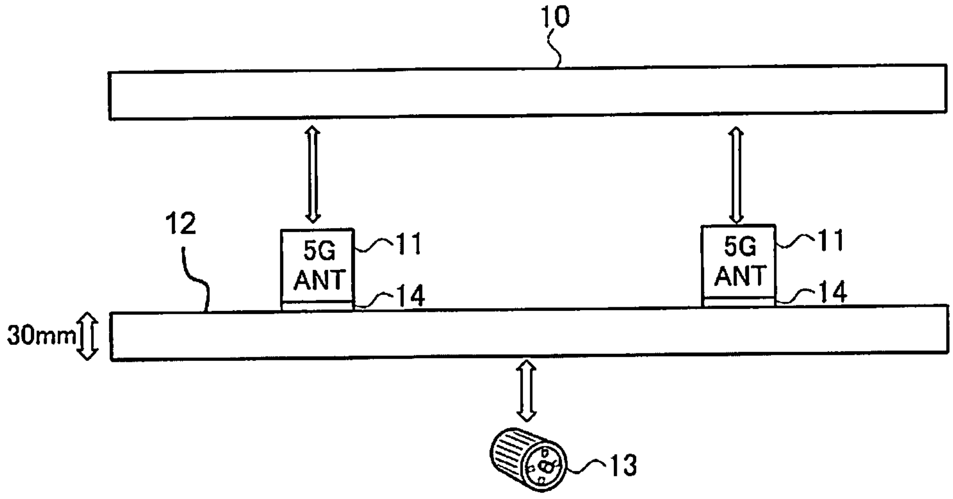
FIG. 2 shows one example of the positioning of the vehicle mounted antenna as seen from a front direction of the vehicle.

An example of positioning a vehicle mounted antenna 11 according to the present embodiment shall be described with reference to FIGS. 1 and 2. FIG. 1 shows one example of the positioning of the vehicle mounted antenna 11 as seen from a lateral direction of a vehicle 1, and FIG. 2 shows one example of the positioning of the vehicle mounted antenna 11 as seen from a front direction of the vehicle 1. FIG. 2 depicts an upper case of a cockpit module 10.

As shown in FIGS. 1 and 2, the vehicle mounted antenna 11 according to the present embodiment is positioned inside the cockpit module 10 above a duct 12 such as that of an air conditioner, at least a certain distance from an on-board device 13 that is a source of noise. The vehicle mounted antenna 11 is used for on-board radio media and communication.

There are no particular limitations on the on-board device 13 that is a source of noise; for example, the on-board device 13 is an actuator, an electrical component, a harness, or the like, which is a component of a blower motor or the like and is a source of electromagnetic noise. It is desirable that the duct 12 and the on-board device 13 that is a source of noise do not come into contact with each other.

FIG. 3 shows a problem in a prior-art example such as that of Patent Citation 1. In Patent Citation 1, to reduce electromagnetic noise in the vehicle, an antenna comprises a horizontally polarized receiving antenna that reduces and eliminates reception of electromagnetic noise having vertically polarized directionality, and a vertically polarized receiving antenna that reduces and eliminates reception of electromagnetic noise having horizontally polarized directionality, and received signals from these receiving antennas are selected or combined.

However, as shown in FIG. 3, the horizontally polarized antenna picks up noise in a 45° direction as well as noise in the horizontal polarization direction, and the vertically polarized antenna picks up noise in the 45° direction as well as noise in the vertical direction. Therefore, a problem is encountered in that the antenna is still affected by noise in a specific noise arrival direction, such as the 45° direction.

In the present embodiment, the effects of electromagnetic noise can be reduced because, as shown in FIGS. 1 and 2, the vehicle mounted antenna 11 is positioned above the duct 12 such as that of an air conditioner, at least a certain distance from the on-board device 13 that is a source of electromagnetic noise.

From the viewpoint of electromagnetic noise reduction, more specifically, it is desirable that the on-board device 13 that is a source of noise be positioned below the duct 12 as shown in FIG. 1. By positioning the vehicle mounted antenna 11 and the on-board device 13 that is a source of electromagnetic noise with the duct 12 therebetween, i.e., by installing the noise-producing on-board device 13 on a surface of the duct 12 that is opposite to the installation surface of the vehicle mounted antenna 11 across the duct, the effects of electromagnetic noise can be further reduced.

Heat generation is more noticeable in the case of a high-frequency antenna such as a 5G antenna, but heat exhaust from the duct 12 can be expected by positioning the antenna above the duct 12. The temperature of air blown inside an air conditioner duct during heating may also be taken into account in the positioning of the antenna.

The vehicle mounted antenna 11 is preferably installed so as to be able to conduct heat with the duct 12. For example, the vehicle mounted antenna 11 may be installed above the duct 12 via a metal bracket 14, as shown in FIG. 2, allowing the heat generated in the vehicle mounted antenna 11 to be transmitted through the metal bracket 14 and transferred to the duct 12.

The metal bracket 14 may be a heat-conducting member that has higher heat conductivity than the vehicle mounted antenna 11, which would allow the heat generated in the vehicle mounted antenna 11 to be efficiently transmitted to the metal bracket 14 side. Furthermore, the metal bracket 14 may be a heat-conducting member that has a higher heat conductivity than the duct 12, which would allow the heat generated in the duct 12 to be efficiently transmitted to the metal bracket 14 side.

From the viewpoint of communication quality, it is desirable that the vehicle mounted antenna 11 be positioned near the center of left and right A-pillars, e.g., at least a certain distance from the left and right A-pillars (front pillars). This makes it possible to minimize any decrease in communication quality due to the effect of the A-pillars.

The vehicle mounted antenna 11 may be positioned a distance from the top of the cockpit module 10 according to a wavelength. For example, since the wavelength of 5G communication is short, the antenna should be installed as high as possible on the cockpit module 10. This can contribute to better communication quality.

From the viewpoint of communication quality, it is desirable that the vehicle mounted antenna 11 has no shielding object such as a hood or a roof at the top. Specifically, the vehicle mounted antenna 11 may be positioned at the bottom of the front window. The vehicle mounted antenna 11 may be capable of 5G communication, and the upper part may have glass transparency. This can contribute to even better communication quality.

The cockpit module 10 may be referred to as an instrument panel or a dashboard, in which case, in the present embodiment, the term "cockpit module" may be replaced with "instrument panel" or "dashboard."

This completes the description of one example of the present embodiment. The positioning examples and elements described in the present embodiment may be implemented in any combination.

According to the embodiment described in detail above, the following effects are achieved.

The vehicle mounted antenna 11 according to the present embodiment is positioned inside a cockpit module 10 above a duct 12 in the cockpit module 10, at least a certain distance from an on-board device 13 that is a source of noise. The effects from noise inside the vehicle are reduced because the antenna is positioned at least a certain distance from the on-board device 13 that is a source of noise, and by positioning the antenna above the duct 12, generated heat can be properly dissipated, and satisfactory communication is possible.

The vehicle mounted antenna 11 may be installed so as to be able to conduct heat with the duct 12. This allows the heat generated by the vehicle mounted antenna 11 to be efficiently dissipated.

The vehicle mounted antenna 11 may be installed with a metal bracket 14 in between the vehicle mounted antenna 11 and the duct 12. This allows the heat generated by the vehicle mounted antenna 11 to be efficiently dissipated and the effects of electromagnetic noise to be shielded by metal.

The metal bracket 14 may have higher heat conductivity than the vehicle mounted antenna 11. This allows the heat generated by the vehicle mounted antenna 11 to be efficiently transferred to the metal bracket 14.

The vehicle mounted antenna 11 may be positioned near the center of A-pillars, at least a certain distance from left and right A-pillars. This can prevent any decrease in communication quality due to the A-pillars.

The vehicle mounted antenna 11 may be positioned a distance from the cockpit module according the wavelength. Positioning the vehicle mounted antenna 11 higher on the cockpit module 10 for shorter wavelengths encountered in 5G communication or the like makes it possible to contribute to better communication quality.

The vehicle mounted antenna 11 may be positioned below the front window. There will be no shielding object such as a hood or a roof above the vehicle mounted antenna 11, which can therefore contribute to communication quality.

The vehicle mounted antenna 11 is capable of 5G communication, and the upper part of the antenna may have glass transparency. This can further contribute to better communication quality.

The on-board device 13 may be positioned below the duct 12. This can further reduce the effects of electromagnetic noise because the vehicle mounted antenna 11 above the duct 12 is positioned opposite the on-board device 13 with the duct 12 therebetween.

The metal bracket 14 may be a heat-conducting member that has higher heat conductivity than the duct 12, which would allow the heat generated in the duct 12 to be efficiently transmitted to the metal bracket 14 side.

An embodiment of the present disclosure was described above, but the present disclosure is not limited to the above-described embodiment and can be carried out with various modifications.

In the above-described embodiment, the description assumes the vehicle 1 has one on-board device 13 that is a source of electromagnetic noise, but the vehicle 1 may be provided with a plurality of on-board devices 13.

A plurality of functions possessed by one constituent element in the above-described embodiment may be realized via a plurality of constituent elements, or one function of one constituent element may be realized via a plurality of constituent elements. A plurality of functions possessed by a plurality of constituent elements may be realized via one constituent element, or one function realized via a plurality of constituent elements may be realized via one constituent element. A part of the configuration of the above embodiment may be omitted. At least a part of the configuration of the above embodiment may be added to or substituted in another configuration of the above embodiment.

The invention claimed is:

1. A vehicle mounted antenna in a cockpit module, wherein the vehicle mounted antenna is positioned above a duct in the cockpit module at least a certain distance from an on-board device that is a source of noise and that is positioned below the duct, the vehicle mounted antenna is installed via a metal bracket that has a higher heat conductivity than the vehicle mounted antenna such that a heat generated in the vehicle mounted antenna and in the duct is transmitted to the metal bracket, and the vehicle mounted antenna is positioned a distance from a top of the cockpit module.

2. The vehicle mounted antenna according to claim 1, wherein the vehicle mounted antenna is positioned at least a certain distance from left and right A-pillars.

3. The vehicle mounted antenna according to claim 1, wherein the vehicle mounted antenna is positioned below a front window.

4. The vehicle mounted antenna according to claim 1, wherein an upper part of the vehicle mounted antenna has glass transparency, and the vehicle mounted antenna is capable of 5G communication.

5. The vehicle mounted antenna according to claim 1, wherein the metal bracket has a higher heat conductivity than the duct.

6. The vehicle mounted antenna according to claim 1, wherein the on-board device is installed on a surface of the duct that is opposite to an installation surface of the vehicle mounted antenna across the duct.

* * * * *